Figure 24:
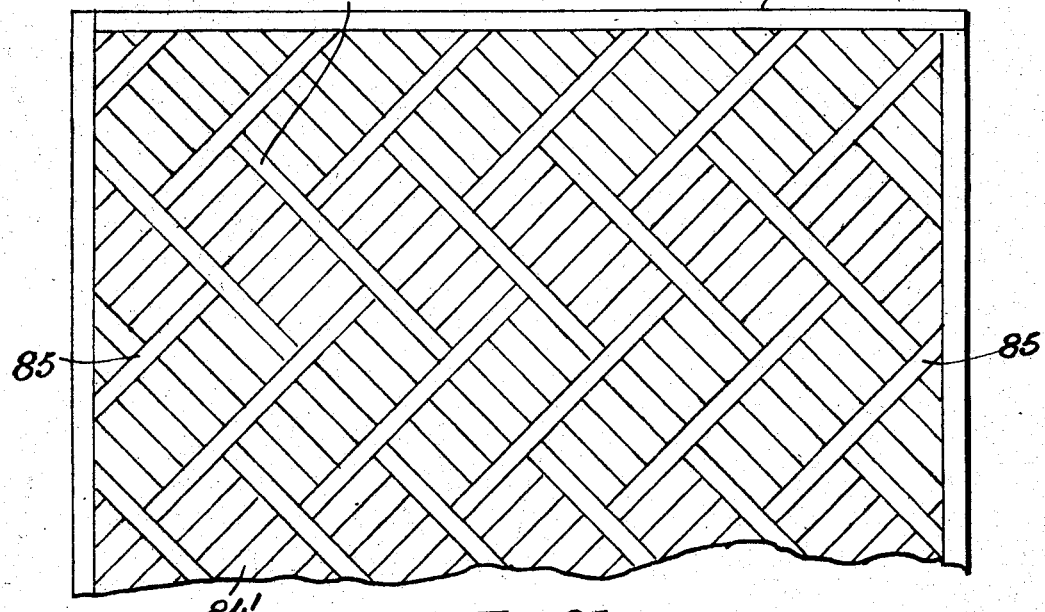

Dec. 24, 1940.   C. W. ALLEN   2,225,612
STRUCTURAL UNIT
Filed July 22, 1936       6 Sheets-Sheet 1
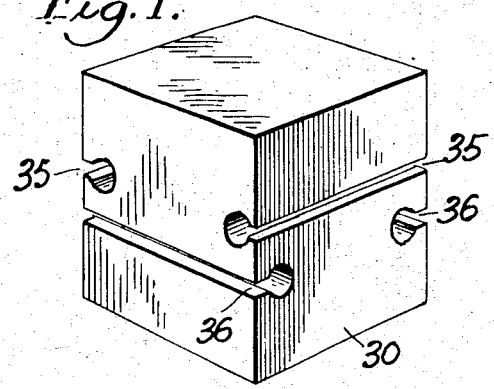
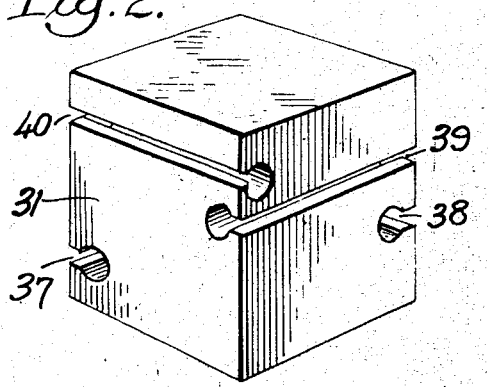
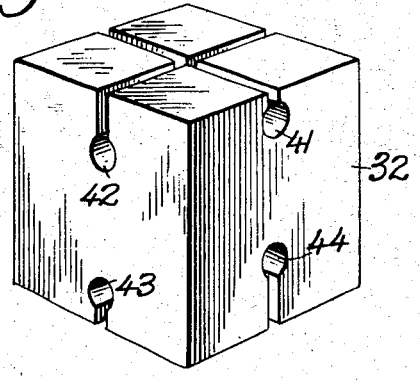
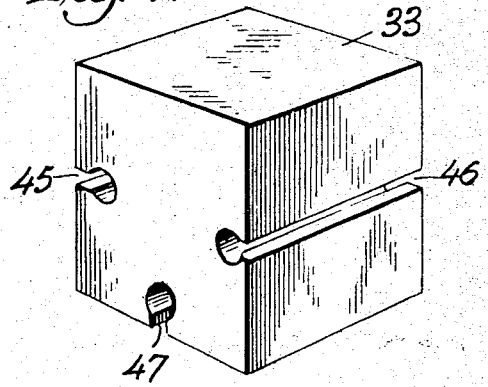
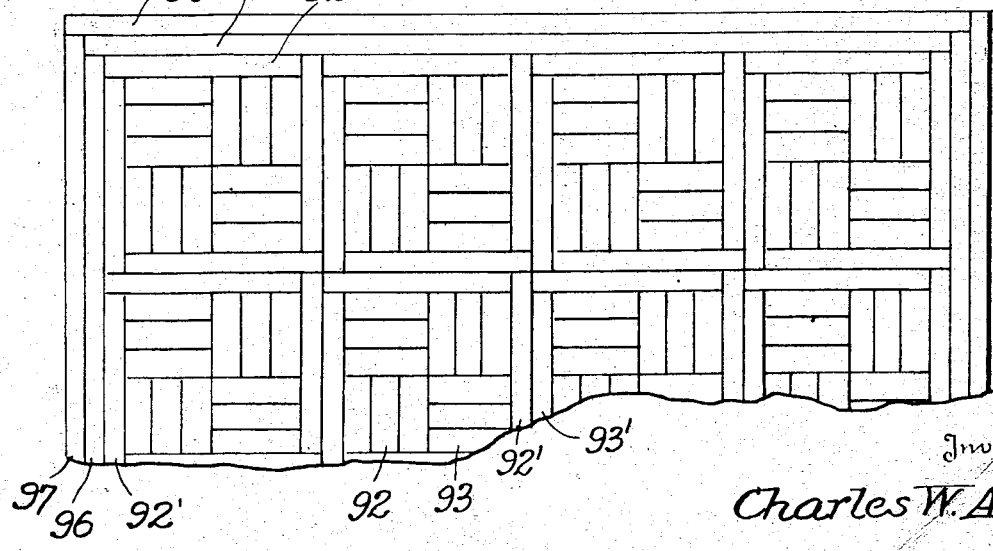
Inventor,
Charles W. Allen,
By John H. Farley
Attorney Dec. 24, 1940. C. W. ALLEN 2,225,612
STRUCTURAL UNIT
Filed July 22, 1936 6 Sheets-Sheet 2
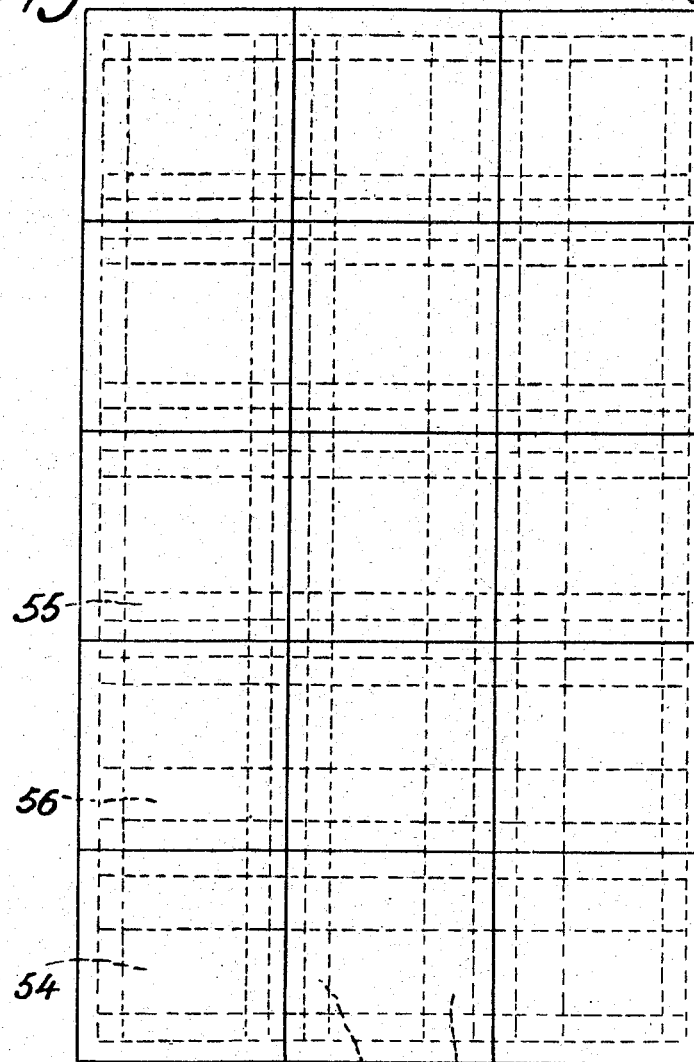
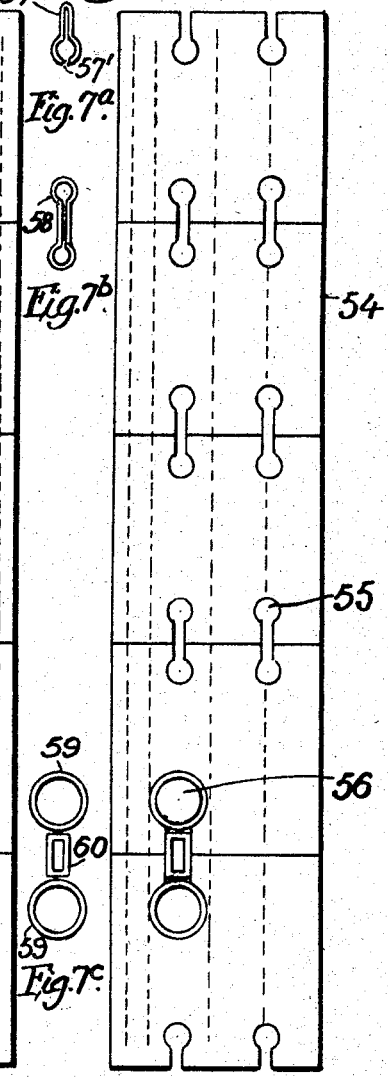
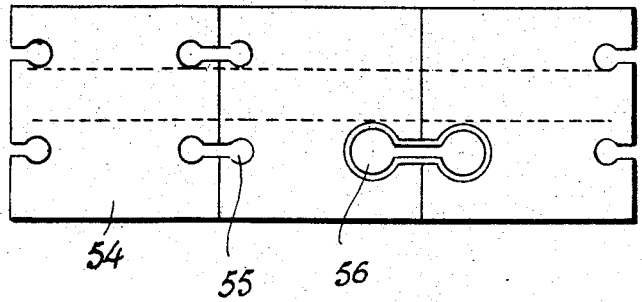
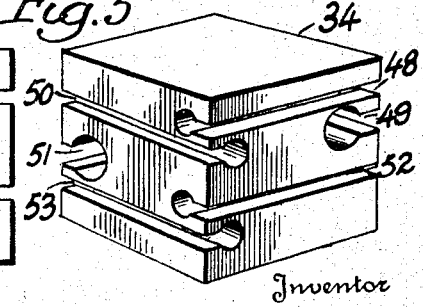
Inventor
Charles W. Allen.
By John W. Farley
Attorney Dec. 24, 1940.   C. W. ALLEN   2,225,612
STRUCTURAL UNIT
Filed July 22, 1936   6 Sheets-Sheet 3
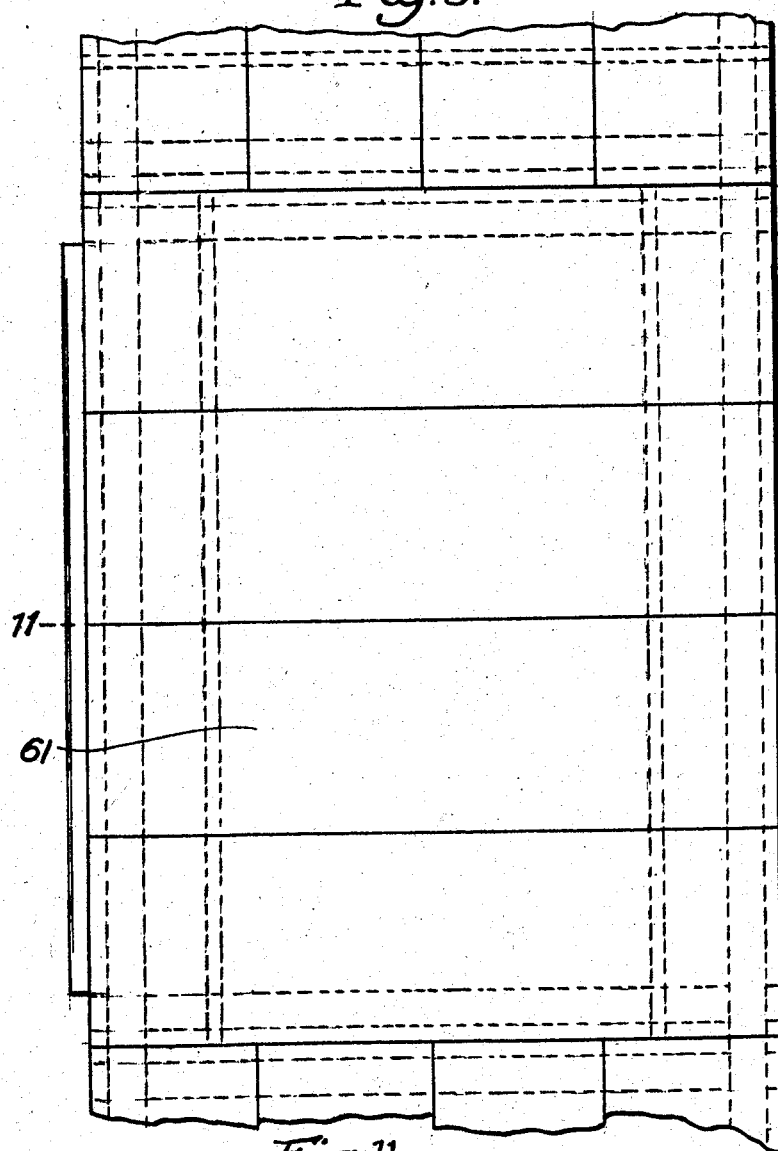
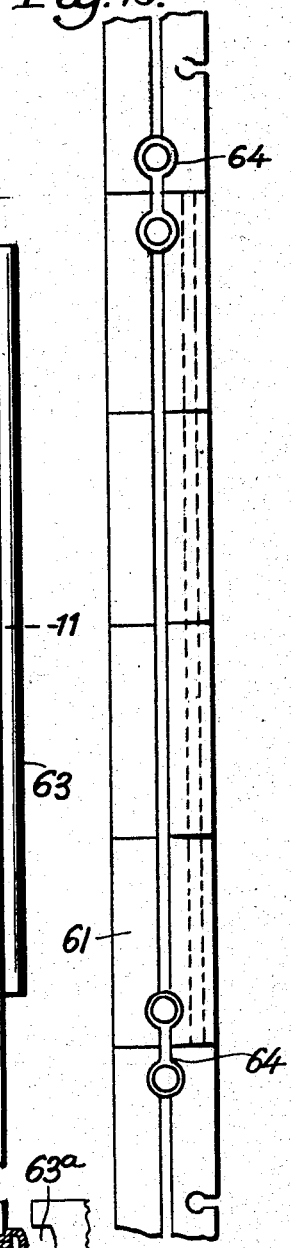
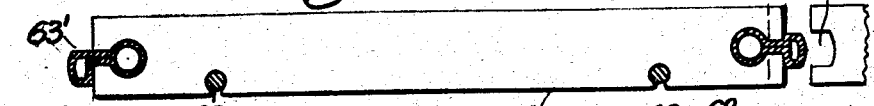
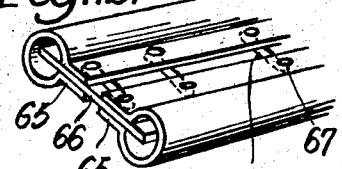
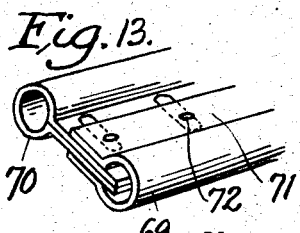
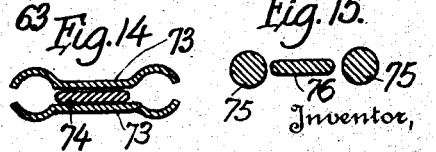
Inventor,
Charles W. Allen,
By John N. Farley
Attorney Dec. 24, 1940.  C. W. ALLEN  2,225,612
STRUCTURAL UNIT
Filed July 22, 1936   6 Sheets-Sheet 4
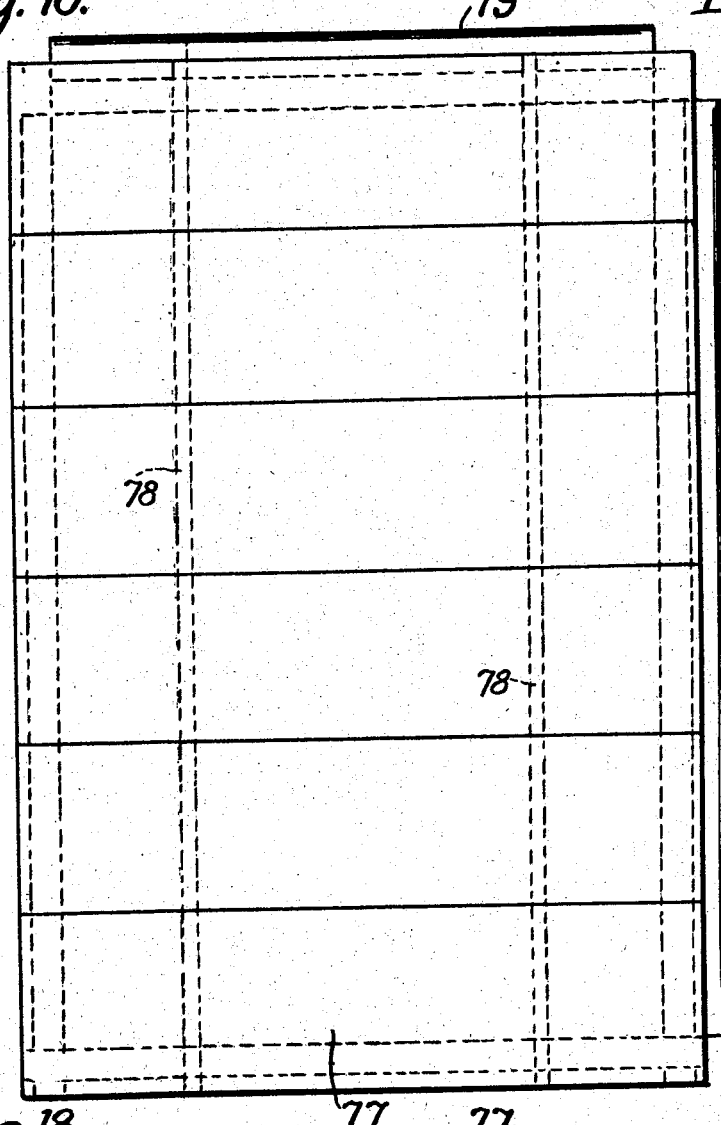
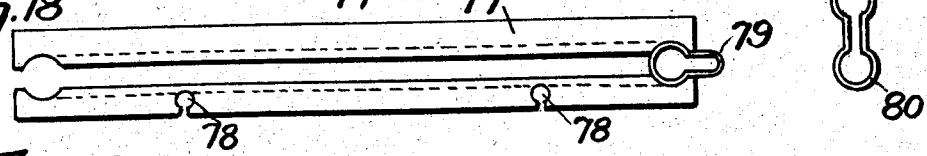
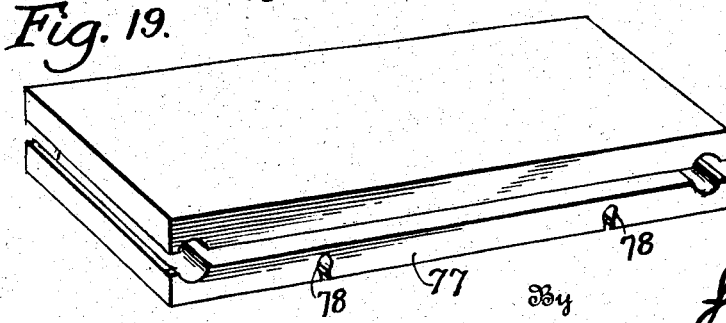
Inventor
Charles W. Allen,
By John W. Farley
Attorney Dec. 24, 1940.  C. W. ALLEN  2,225,612
STRUCTURAL UNIT
Filed July 22, 1936  6 Sheets-Sheet 5
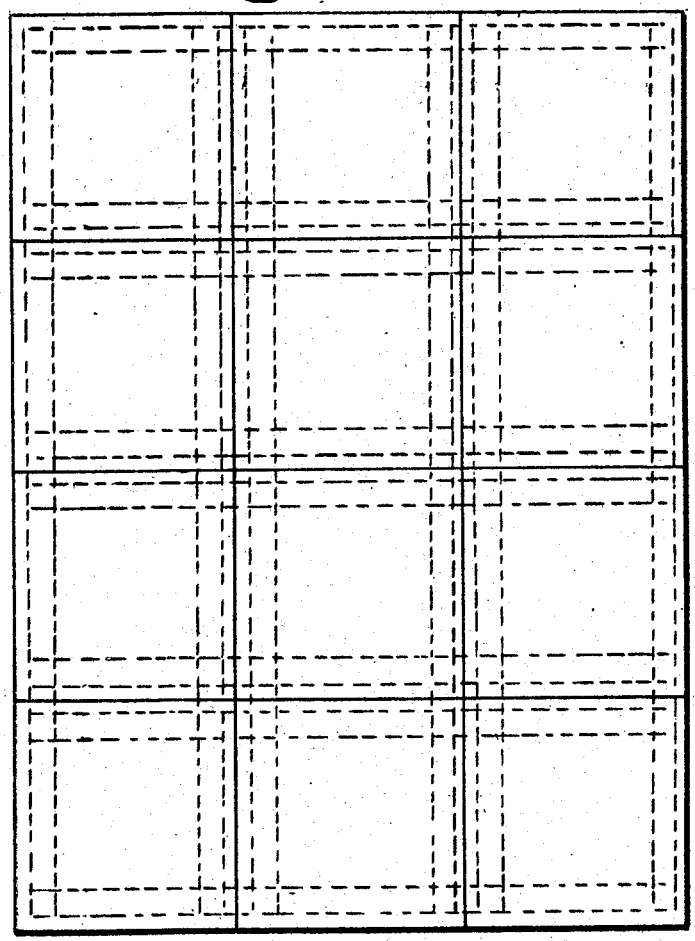
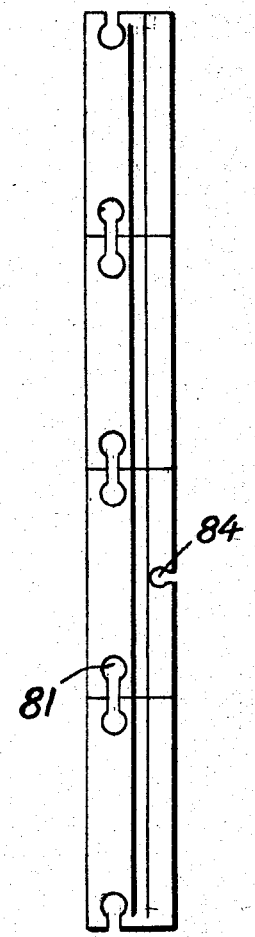
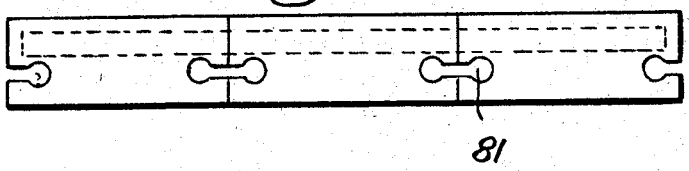
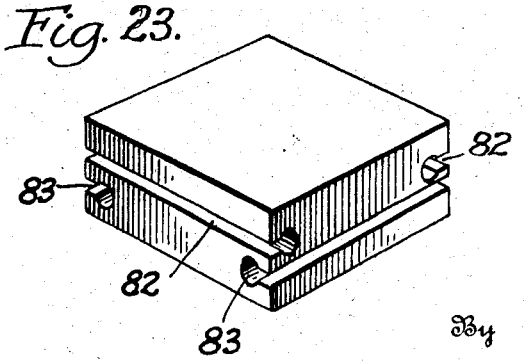
Inventor,
Charles W. Allen,
By John W. Farley
Attorney Patented Dec. 24, 1940

2,225,612

UNITED STATES PATENT OFFICE 2,225,612

STRUCTURAL UNIT

Charles W. Allen, Memphis, Tenn.

Application July 22, 1936, Serial No. 91,959

10 Claims. (Cl. 20—0.5)

My invention relates to improvements in the art of utilization of wood, and particularly to means and methods whereby it has been found possible to use small pieces of wood in effective manner in building operations, so that a great deal of the waste formerly thought unavoidable has been obviated. By the use of such expedients as are disclosed herein and in my co-pending application No. 591,292, filed Feb. 6, 1932 (now Patent No. 2,087,958), and to which reference may be had for fuller discussions of the advantages had and the difficulties avoided by the use of my invention, it is possible to use wood that would otherwise be wasted, as by reason of the smallness of the pieces and because it occurs in the same piece with unsound wood or wood of inferior character.

One of the main problems arising in the use of wood in buildings and the like arises out of the fact that moisture is bound to be absorbed by wood from the air and from surrounding or contacting materials that are damp or wet. This causes the wood to expand with great force, such that curling and warping and the bulging of floors, etc., will inevitably follow the contraction and expansion that follow upon changes in the humidity of the surroundings, regardless of the strength of the glue, nails, etc., that may be used in an effort to prevent such undesirable effects. It is an object of my invention to fasten the parts securely in place, yet with sufficient space or clearance between parts as to permit the necessary expansion and to prevent buckling.

In the handling of small pieces another disadvantage resides in the amount of time that is required to assemble them in connection with a building operation, and it is an object of my invention to provide convenient and desirable means whereby the small pieces may be assembled in the factory into units of substantial size, whereby these units may be shipped without danger of coming apart, and whereby they may be laid rapidly in a desired arrangement, e. g., to form a floor or the like.

A specific purpose of my invention is to facilitate the laying of such floors as are made up of small blocks of wood, usually laid in such manner that the grain of the wood is vertical, whereby the wearing qualities of the floor are increased greatly over the situation where the grain runs parallel to the surface of the floor.

For assembling and holding together a number of small blocks or other suitable pieces in units that can be laid rapidly it is my intention to use splines of novel character, such as disclosed in my pending application above referred to, and it is another specific object of the present application to disclose and provide novel and improved splines suitable for the purposes set forth.

Another object of the invention is to provide and disclose expansion strips of a character suitable to cooperate with units of the character described herein, which expansion strips guide the direction of expansion and serve to control the same, as hereinafter explained.

Other objects and advantages of the invention will be apparent to those skilled in the art from the detailed description hereinafter appearing, taken in conjunction with the annexed drawings which are made a part of this application, and in which Fig. 1 is a perspective of a block such as may be used in the practice of my invention, Fig. 2, a perspective of another form of block, Figs. 3 to 5, further modifications, Fig. 6, a structural unit including blocks of wood such as those of Fig. 5, Fig. 7, a side elevation of Fig. 6, Fig. 8, an end elevation of the same, Figs. 7a, 7b, and 7c, end elevations of splines that may be used to unite the parts of a structural unit such as that of Fig. 6, Fig. 9, a top plan of another form of structural unit, Fig. 10, a side elevation of the same, Fig. 11, an end elevation thereof, Fig. 12, a perspective of a spline of modified form, Fig. 13, another modification, Figs. 14 and 15, further modifications shown in section, Fig. 16, a top plan of another structural unit, Fig. 17, a side elevation of the same, Fig. 18, an end elevation thereof, Fig. 19, an end elevation of an intermediate section of the unit, Fig. 20, a top plan of another structural unit, Fig. 21, a side elevation of the same, Fig. 22, an end elevation thereof, Fig. 23, a perspective of a block of modified form, Fig. 24, a top plan of a section of flooring, and Figs. 25 and 26, top plans of other forms of flooring which may be made according to my invention and which may obviously be laid as sections of a floor or may constitute a complete floor, according to the building conditions and the size of rooms, etc.

In the drawings, reference characters 30, 31, 32, 33 and 34 (Figs. 1 to 5) indicate blocks such as may be laid after the general manner indicated in Fig. 6, it being understood that many variations in the design of the floor, as well as in the shape and size of the blocks, etc., may be utilized within the scope of the invention. It will be seen that block 30 has parallel keyhole slots at opposite sides of the block, the pairs of slots being indicated by reference characters 35, 35 and 36, 36, and being of like dimensions but one pair being in a different plane from the other pair. The top and bottom of this block are smooth and unslotted and the block is preferably formed with the grain running vertically of the block.

Block 31 is generally similar to block 30, but instead of having pairs of slots at the same level the slots are arranged stepwise around the block, each slot being at a different level from those in adjacent sides and at a different level from that at the opposite side of the block. Note the ascending series 37, 38, 39, 40.

In block 32 the slots are arranged in pairs intersecting the upper and lower faces of the block, the slots 41 and 42 crossing at right angles in the top face and slots 43 and 44 crossing similarly in the bottom of the block. Slots 42 and 43 lie in the same plane, as do also slots 41 and 44, and slots 42 and 44 are deeper than the others for reasons that will appear hereinafter. This block is intended for use in locations where the block will be covered with asphalt or the like, but may also be used without covering like the other blocks, in which case the neck of the slot will be filled with plastic wood or the like after being laid, so as to give the appearance of a solid block. Or the keyhole slot may be filled with plastic material just prior to insertion of the splines hereinafter described, whereby the splines will force out the excess material, leaving the necks full of material which soon hardens and affords the appearance of a solid block.

Block 33 has a plain top and has two side slots 45 and 46 at the same level, though they may be at different levels, this block also having a bottom keyhole slot at 47.

Block 34 has a slot at one side as shown at 48, a pair of slots in opposite sides at a lower level, the slot 49 being of larger size than slot 50, another pair of slots in the other two sides at a lower level than slots 49 and 50, the slot 51 of this last-named pair being larger than slot 52, and a slot 53 at the lowest level and directly below slot 50, the top and bottom of this block being plain.

As explained in my patent above referred to, there are important manufacturing advantages in the use of a keyhole slot for structural wood items of various kinds. The blocks so far referred to may be united by splines such as illustrated in that application, but I have also shown other forms that can be used and that are advantageous in certain situations.

Figs. 6 to 8 illustrate a unit of flooring (or which can also be used for other purposes) consisting of blocks 34 combined with blocks 54 having pairs of parallel slots in opposite sides. As shown, the blocks are united into a unit by means of splines of material that does not absorb moisture, the splines fitting snugly in the slots, though not so tight as to interfere unduly with the operation of assembling the units. The splines are of what I call a "dumb-bell" shape, and comprise small splines 55 and large ones 56, in accordance with the size of the keyhole slot in which the spline is to be located.

Splines of modified form are shown in Figs. 7a, 7b and 7c, spline 57 being a resilient sheet metal spline of a type shown in my co-pending patent; spline 58 being similar but not interrupted, as spline 57 is at 57'; while the spline of Fig. 7c consists of three parts of which the end members 59, 59 are tubes with a rod or bar inserted between them to fill the necks of the slots. Obviously the dumb-bell splines such as 55 and 56 serve to unite the blocks into strips and the strips into a wider unit, such as that of Fig. 6, while the spline of Fig. 7c serves to unite the blocks into a strip only, the bar filling the necks of a pair of adjoining slots, or it may be narrow so as to fill only a neck as at the left of Fig. 8, if desired.

Figs. 9 to 11 illustrate methods and means for uniting blocks or strips of material thinner than those just described. The blocks or strips or pieces 61 may be so thin as to permit the forming only of a single set of keyhole slots of slight depth in the bottom and other keyhole slots in the side and edge faces. As here shown a unit consists of four pieces each having a pair of slots at the bottom for receiving splines 62 of the simple form illustrated in my co-pending patent. At the ends of the pieces (i. e., at the sides of the unit) deeper slots are provided which may receive dumb-bell splines, but are here shown as receiving splines 63, 63' with a rigid tongue of a shape approaching the square and adapted to fit into a shallow U-shaped slot such as shown at 63a, this slot being formed in an adjoining member or unit. The shape of the tongue may be varied to suit the slot that can be made conveniently in the adjoining member, e. g.; such a tongue can be used as shown on spline 57 (Fig. 7a). At its ends the unit is shown as being united to other units by means of splines 64 of a solid dumb-bell shape.

Figs. 12 to 15 illustrate modified forms of splines such as may be used where preferred. The splines of Figs. 12 and 13 are adjustable in width. For this purpose the spline of Fig. 12 consists of three parts, two of which are bent into cylindrical form with parallel tongues spaced apart to receive a flat slip 66 of metal connected to the tongues by rivets 67 placed in holes in the tongues and passing through elongated slots 68 in the slips, as indicated by dotted lines. In the case of Fig. 13, the one member 69 is like the side members of the spline in Fig. 12, but member 70 preferably has its tongues in contact with each other and formed with elongated slots at 71 to receive rivets 72 connecting the tongues of the member 69, thereby permitting the spline to be pulled laterally apart to widen it, or to be pressed together to narrow it.

The spline of Fig. 14 comprises members 73, 73 flared at their ends to make a cylindrical shape when combined, these members being resilient so as to yield in assembling and to spring out to hold the parts connected thereby securely in the desired relation, and they are spaced apart by a flat rod 74, which obviously may be inserted at the same time with the members 73, or subsequently.

The spline of Fig. 15 is similar to that of Fig. 7c, except that it consists of two solid round bars 75, 75 and a solid flat bar 76.

In Figs. 16 to 19 I have shown a modification wherein a series of pieces 77 is connected by means of simple splines 78 inserted into keyhole slots in the bottom and resilient splines 79 at the edges, said splines having flat-sided tongues, while the unit so formed is or may be connected to adjoining units by means of resilient dumb-bell splines 80, all slots being keyhole slots, as before. It will be understood that all splines are made of metal, or at least of non-moisture-absorbing material, in the preferred forms and uses of my invention, in order that the movement of the pieces of wood due to swelling upon absorption of water and due to contraction upon drying may not be interfered with.

In Figs. 20 to 23 I have shown a unit made up of small blocks of no great thickness, the rows of blocks being connected by dumb-bell splines 81 and the blocks in each row being similarly connected. Here the blocks are formed with two sets of slots, the oppositely located slots 82, 82 being at one level and the oppositely located slots 83, 83 being at another level. As in all other cases the slots are so placed as to permit a plane to be passed between the vertically spaced series without cutting the enlarged parts of the keyhole-shaped slots, excepting in the case of block 32, where the spline most remote from the adjacent face must be of some such simple form as spline 62 in Fig. 11. Keyhole slots may be made in the bottom of the unit, as at 84 in Fig. 21, and splines may be inserted therein either lengthwise of the unit or crosswise thereof to strengthen it. The advantage of such combinations of splines is very considerable, since it has been found that where splines are used only at the bottom the unit may be made to buckle much more easily than where two or more sets of splines are used. For example, in using blocks of the type shown in Fig. 4, twice as much pressure is required to buckle a unit having its parts connected by splines at the bottom and sides as is needed when the parts are connected only at the bottom.

Figure 25:
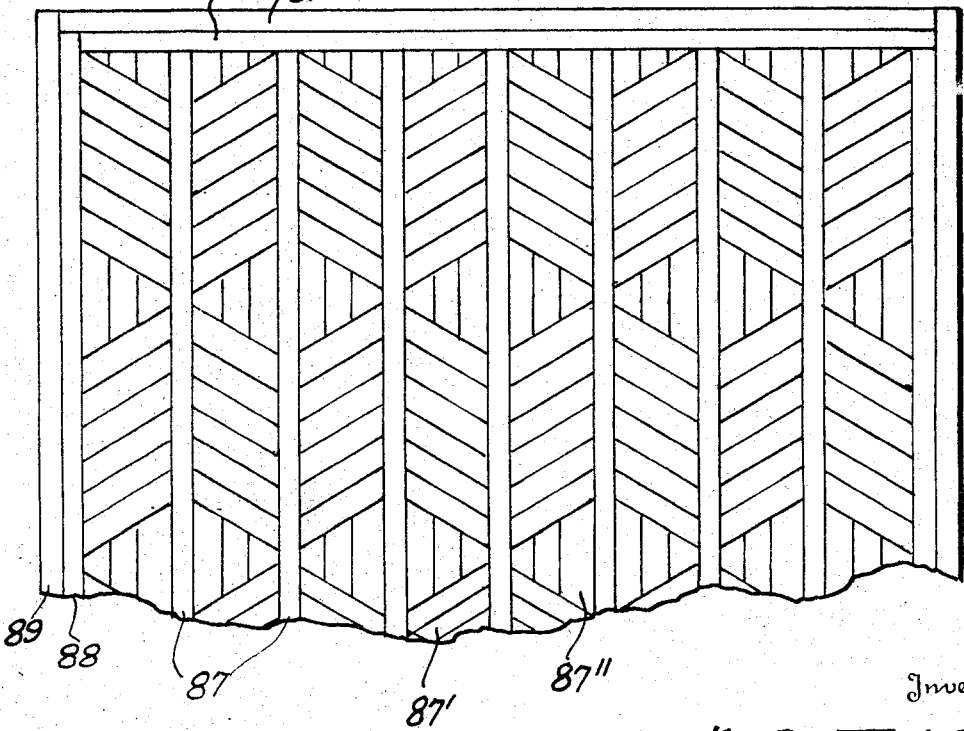

Figs. 24 to 26 illustrate a few of many designs of floors, etc., that may be made up by the use of my invention, in combination with expansion strips now to be described. In Fig. 24, e. g., there are shown a plurality of units or blocks each consisting of seven strips 84' of wood which are connected by means of splines as above described, permitting them to expand freely to a limited extent such as is necessary to take care of the natural expansion and contraction due to changing temperatures and humidity in the atmosphere, or to moisture rising from the foundation, etc. These units are spaced apart by expansion strips or spacers 85, laid in a sort of zigzag pattern, and the length of the expansion strips is such as to predetermine the space allowed for expansion of the strips 84' of the adjoining units, i. e., assuming that each strip is two inches wide and that a space of 1/32 inch is allowed between them for expansion, the spacers 85 will be 7 x 2 inches plus 7/32 inch, or a total of 14 7/32 inches long, plus an amount to take care of the width of an abutting spacer and the length of an adjacent strip 84', in the case of a full-length spacer such as 85ª. The length of the marginal strips 86 is determined in like manner.

The design in Fig. 25 has expansion members 87 extending the full length of the floor inside the marginal members for separating parts each consisting of diagonally arranged strips 87' combined into units and interspersed with units consisting of strips 87'' extending parallel to the spacers 87. The spacers determine the expansion space for the units and their constituent parts and serve as guiding means in laying the floor, etc., and as pattern-forming means. There is a double series of marginal members 88, 89, 90 and 91.

In Fig. 26 the units consist of three strips each, assembled and connected as above described, the strips running in one direction being marked 92, while those running transversely thereof are marked 93. The units are arranged in groups of four units of which two are at right angles to the other two, as to their constituent strips. Each such group is surrounded by spacers or expansion strips 92', 93', each laid with a face against the end of another spacer and its other end against the face of the next spacer. Thus it will be seen that no strip 92, 93 or spacer 92', 93' lies with its end against the end of another like member (differing in this respect from Fig. 25), but always an end rests against a side of a strip, whether it be one of the short constituent strips of the units or a spacer strip. The double series of marginal members of the floor are laid in similar manner, the ends of members 96, 97 lying against side faces of members 98, 99 and the end of member 98 lying against a side face of member 97, etc.

In the case of small wooden blocks such as herein referred to, they can easily be assembled at the factory, after cutting, into an assembly having a length of six feet, for example, and these rows can be connected into units of a width of three feet, for example, and all this work can be done mechanically, thus saving a great deal of time in laying a floor or the like. These assemblies are of course to be secured together by means of the splines herein described, or other equivalent means. No great strength is required in the splines, as they are not relied on to take the place of nails in securing the parts rigidly to the foundation, but the parts are all free to move within limited bounds, it being the primary purpose of the invention to permit free limited expansion to the necessary extent, and to divide the expansion, or control it, so that the effect will distribute itself over the entire area of a floor instead of being confined to some small area where expansion is excessive, and thus to cause buckling at such area.

The invention is not limited to the use of any particular number of splines or systems of splines, as thicker members may be connected by greater numbers of systems than here illustrated. It is, however, desirable that the series should be separated by definite planes so that the splines may not interfere with each other and so that correct adjustment may be had, the accuracy of adjustment being much increased by two sets of splines as compared with a single set. Generally speaking, the size of the keyhole slots is of importance only in that larger splines cause more friction than smaller ones and are objectionable for that reason. All that is necessary is that the splines shall be readily insertible and strong enough to hold the units while being handled.

It will be obvious to those skilled in the art that many other variations may be made in the details and applications of my invention in addition to what is above disclosed, all without departing from the spirit of the invention; therefore I do not limit myself to what is shown in the drawings and described in the specification, but only as indicated in the appended claims.

Having thus fully described my said invention, what I claim is:

1. A structural piece of wood having parallel top and bottom faces, said piece having in each of said faces a pair of keyhole slots, the necks of said slots cutting the adjacent face and intersecting each other, and the bores of said slots being parallel to the adjacent face but differently spaced therefrom.

2. A structural unit comprising contacting pieces of wood each having keyhole slots arranged in non-parallel faces thereof in non-intersecting relation, said slots each comprising a bore parallel to a face of such piece and a neck extending through said face, and loosely-fitting, readily-insertible splines extending transversely of each other for uniting said pieces, each spline having a bore-engaging portion materially greater in thickness than the width of said neck.

3. A device as in claim 2, at least some of said splines being of dumb-bell shape in cross section and comprising a flat bar interposed between a pair of separate resilient metallic members each flaring outwardly at its edges beyond said bar.

4. A device as in claim 2, said unit having keyhole slots in its bottom and in opposite sides thereof and having splines in said slots.

5. A device as in claim 2, said unit having keyhole slots in its bottom, its sides and its ends, and having splines in said slots.

6. A device as in claim 2, said unit having keyhole slots in its bottom, its sides and its ends, and having splines in said slots, the slots in its sides and ends lying in closely adjacent planes.

7. A device as in claim 2, including splines having a rigid parallel-sided tongue rounded at its outer end to fit in a shallow U-shaped groove in an adjoining unit.

8. For use in assembling pieces of wood having keyhole slots in their adjacent faces, a spline of dumbbell shape so constructed as to be adjustable in width, said spline comprising a pair of cylindrical longitudinal members, a tongue on each of said members, and means connecting said tongues adjustably, whereby the width of the spline may be adjusted.

9. For use in assembling pieces of wood having keyhole slots in their adjacent faces, a spline of dumbbell shape so constructed as to be adjustable in width, said spline comprising a pair of tubular members with longitudinally extending tongues protruding therefrom, the tongue on one of said members overlapping the other tongue, and pins on one tongue extending through holes in the other tongue, said holes being elongated laterally of said spline.

10. For use in assembling pieces of wood having keyhole slots in their adjacent faces, a spline of dumbbell shape so constructed as to be adjustable in width, said spline comprising a pair of sheet metal members shaped to provide a tube with a protruding tongue along a side thereof, a strip of metal contacting with said tongues and having slots extending crosswise of said spline, and pins on said tongue extending through said slots, whereby said spline may be adjusted in width.

CHARLES W. ALLEN.